May 20, 1969  L. N. BLURTON  3,445,618
SPOT WELDER
Filed May 3, 1965　　　　　　　　　　　　　　Sheet 1 of 2
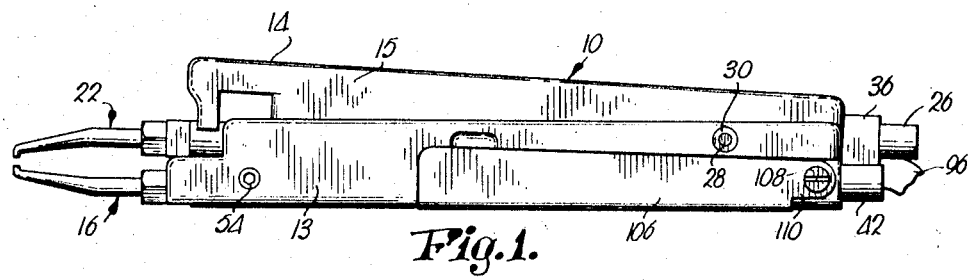
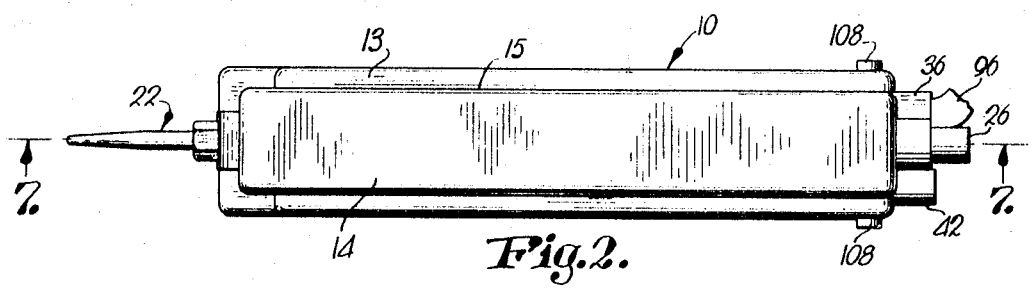
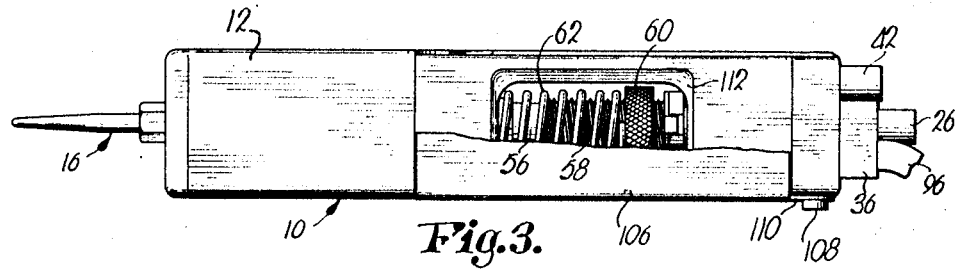
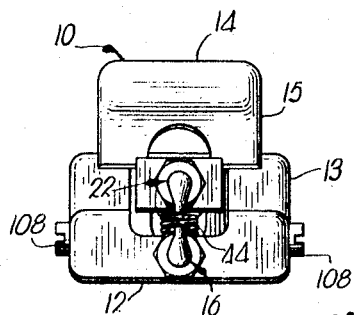
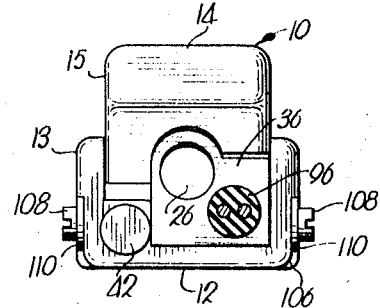
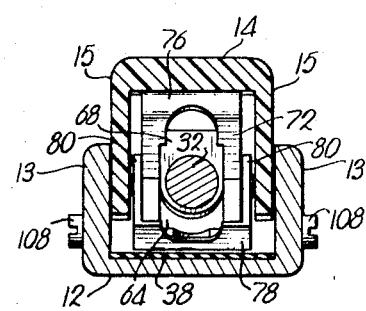
INVENTOR.
Lloyd N. Blurton
BY
Hovey, Schmidt, Johnson & Hovey
ATTORNEYS.

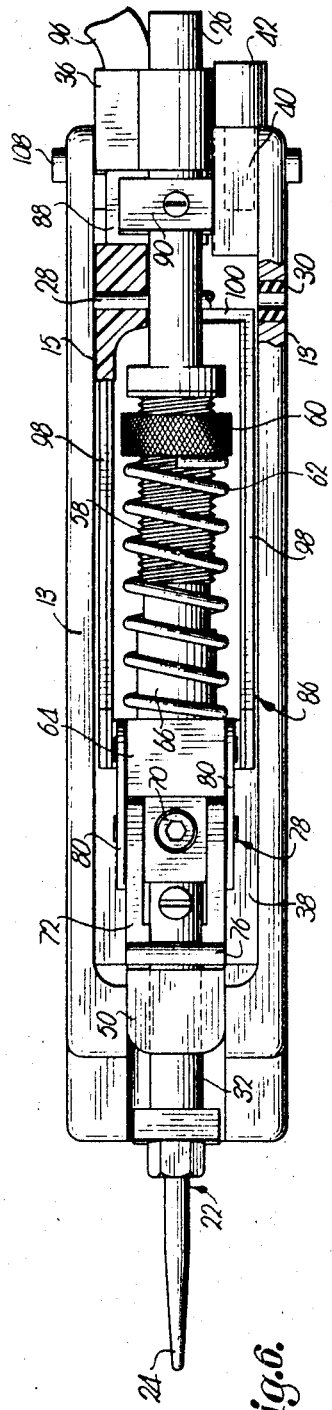
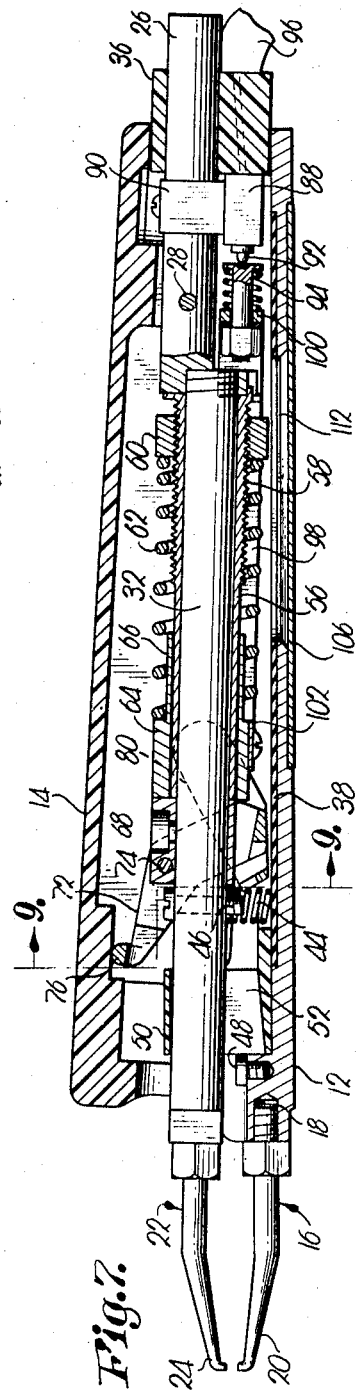
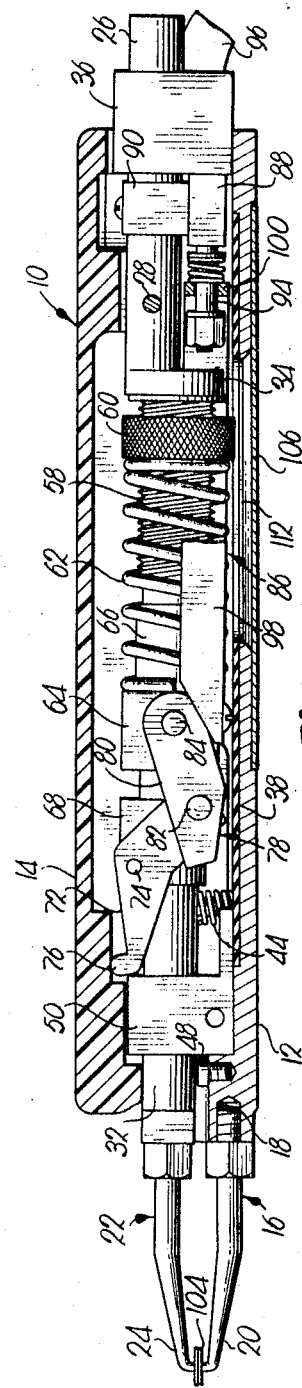
INVENTOR.
Lloyd N. Blurton though other sizes may be utilized depending on the particular welding application. Case 10 comprises an electrically conductive base portion 12 which serves as a mounting means for the various components of the device, and insulated cover 14 which is shiftable with respect to base 12 to control the operation of the welder, as will become clear hereinafter. Base portion 12 is provided with opposed side walls 13 which receive the sides 15 of cover 14 therebetween.

United States Patent Office 3,445,618
Patented May 20, 1969

3,445,618
SPOT WELDER
Lloyd N. Blurton, 309 Belmont,
Liberty, Mo. 64068
Filed May 3, 1965, Ser. No. 452,828
Int. Cl. B23k 11/10
U.S. Cl. 219—90                     5 Claims

ABSTRACT OF THE DISCLOSURE

A spot welder to be utilized in the assembly of miniature and subminiatiure electrical components comprising a pair of electrodes, one being movable with respect to the other, switching means for controlling the flow of welding current to the electrodes, an actuator for said swinging means and operating means coupled with one of said electrodes and the actuator, said operating means disposed to be shifted in such a manner as to move said one electrode toward the other electrode whereby to clamp a workpiece between the electrodes and subsequently initiate operation of the switching means to deliver current to the electrodes.

---

The primary object of this invention is to provide a manually operated spot welder siutable for bench mounting or handheld operation, depending on the size of the welder and the particular application, which will minimize operator fatigue after extended use.

It is another object of this invention to provide a spot welder of the tweezer type which may be conveniently hand-held and manually operated by the fingers of one hand and which, as aforesaid, will minimize operator fatigue.

Still another object of the instant invention is to provide such a tweezer welder that will form a uniform joint even though the force with which the operator grips the welder undergoes variation due to a difference in the strength of individual operators, day-to-day variation of muscular strength, or a decrease in force caused by extended operation of the welder without periodic rest breaks.

Other objects will become apparent as the detailed description proceeds.

In the drawings:

FIGURE 1 is a side elevational view of the tweezer welder;

FIG. 2 is a top plan view thereof;

FIG. 3 is a bottom view of the weder, a portion of the case being broken away to reveal details of construction;

FIG. 4 is an end view showing the welding tips;

FIG. 5 is an end view of the opposite end of the welder as compared with FIG. 4;

FIG. 6 is a top plan view showing the welder with the cover of the case broken away;

FIG. 7 is a horizontal sectional view taken along line 7—7 of FIG. 2, the electrodes being shown in elevation for clarity;

FIG. 8 is a view similar to FIG. 7 except that the components of the welder are shown shifted to their operative positions with the welding tips clamped against a workpiece to be welded; and FIG. 9 is a vertical, sectional view taken along line 9—9 of FIG. 7.

The numeral 10 denotes an elongated case which is adapted to be hand-held by an operator. By way of example, case 10 may be approximately five inches in length and approximately one inch in width, although other sizes may be utilized deepnding on the particular welding application. Case 10 comprises an electrically conductive base portion 12 which serves as a mounting means for the various components of the device, and insulated cover 14 which is shiftable with respect to base 12 to A fixed electrode 16 is threaded into a tapped opening 18 in one end of base 12 and extends outwardly therefrom, terminating in a welding tip 20. An elongated, movable electrode 22 extends through case 10 longitudinally thereof and terminates in a welding tip 24 at one end thereof adjacent tip 20. The end portion of electrode 22 opposite from the welding tip 24 comprises an electrically conductive rod 26 which is pivotally mounted between side walls 13 by a pivot pin 28 extending between side walls 13 and journaled therein by insulated bushings 30. Only one of the bushings 30 is visible in the drawings (see FIGS. 1 and 6), it being understood that the other bushing is located in the opposite side wall 13. The central portion of the elongated electrode 22 comprises a cylindrical conductor 32 threadably received by an offset 34 on the end of the rod 26 within case 10.

Welding current is supplied to the two electrodes 16 and 22 by a power supply (not shown) having a low voltage output but capable of delivering very high amperage. One side of the power supply output is connected to the end of rod 26 extending from rear of case 10, this portion of the rod being encased in an insulator 36 which leaves the rearmost tip of rod 26 exposed for coupling purposes. Thus, welding current is permitted to pass through the length of electrode 22 to the welding tip 24 without being shorted to the conductive base 12 of the case due to the presence of the insulated bushings 30. Other possible shorting paths are eliminated by the use of an insulated strip 38 which is embedded in base 12 on the interior of case 10, and the insulated cover 14.

A female receptacle 40 in the form of a boss having a bore therein extends from the internal surface of the left side wall 13 at the rear of case 10 and receives a male plug 42 which may be connected to an insulated wire cable by any suitable means in order to electrically connect electrode 16 with the other electrical side of the power supply. Since the base 12 of case 10 forms the conductive path from receptacle 40 to electrode 16, the latter may be maintained at ground potential.

Electrodes 16 and 22 are normally spaced apart as illustrated in FIGS. 1, 4 and 7 by a spring 44 which is compressed between strip 38 and the underside of conductor 32. A screw 46 extends transversely through conductor 32 and along the axis of spring 44 to preclude unseating thereof. An insulated screw 48 (composed of nylon or the like) is threaded into a tapped opening adjacent electrode 16, the head of this screw serving as a stop to positively prevent electrodes 22 and 16 from contacting each other except at the welding tips 20 and 24.

An insulated guide 50 in the form of a block having a vertical slot 52 therein receives conductor 32 and permits movement of tip 24 toward and away from tip 20 between the position illustrated in FIG. 7, where conductor 32 is forced against the undersurface of the top of guide 50 by spring 44, and the maximum possible displacement of tip 24 toward tip 20, which would occur when conductor 32 engaged the head of insulated screw 48. This would normally not occur unless the welding tips are subjected to extreme wear. Guide 50 is held between side walls 13 by opposed screws 54 extending inwardly toward one another from side walls 13 and into engagement with the sides of guide block 50. Only one of the screws 54 is visible in the drawings (see FIG. 1).

A tubular sheath 56 is slipped over conductor 32 and secured thereto, sheath 56 being provided with external threads 58 upon which a knurled nut 60 turns. A coil spring 62 around conductor 32 extends between nut 60 and a hollow block 64 which receives conductor 32 and sheath 56. Block 64 is integral with a sleeve 66, the block and the sleeve being longitudinally shiftable on sheath 56 as may be seen by a comparison of FIGS. 7 and 8.

A stop 68 receives conductor 32 and is rigidly secured thereto adjacent screw 46 by a setscrew 70. Normally, spring 62 biases block 64 into engagement with stop 68 as shown in FIG. 7. An operating member 72 is pivotally mounted on stop 68 by a pin 74. Member 72 comprising a bell crank assembly is pivotally mounted on stop 68 by pin 74. Operating member 72 has two crank sections which pivot about pin 74 and are integrally joined by a crosspiece 76. A U-shaped linkage 78 couples crank member 72 with block 64, linkage 78 including a pair of link arms 80 joining respective sections of member 72 with the sides of block 64. Each arm 80 is joined to the associated section of crank member 72 and the corresponding side of block 64 by pivotal connections 82 and 84 respectively.

An actuator 86 is connected to the underside of block 64 and is employed to operate a microswitch 88 secured to rod 26 by a mounting bracket 90. Microswitch 88 is provided with an actuator button 92 which is depressed by a spring-loaded plunger 94 forming a part of actuator 86. Microswitch 88 is connected by cable 96 to the control circuitry (not shown) of the power supply so that, when button 92 is depressed as shown in FIG. 8, welding current will flow in the electrodes 16 and 22. Such control circuitry is conventional in the art and, for example, may simply comprise a relay which normally interrupts the output of the power supply but which, upon actuation of microswitch 88, changes to its off normal state and closes the output circuit of the power supply to permit the delivery of welding current therefrom.

Actuator 86 further comprises a pair of legs 98 extending along opposed sides of conductor 32 and coil spring 62, legs 98 being interconnected by an integral cross member beneath pin 28, cross member 100 being apertured to receive the spring-loaded plunger 94 which extends rearwardly therefrom toward the actuator button 92 of microswitch 88. The forward ends of legs 98 are integrally interconnected by a crosspiece 102 which is, in turn, rigidly secured to the underside of block 64.

In operation, rod 26 and plug 42 are electrically coupled with the power supply output and cable 96 is connected with the output control circuitry as discussed hereinabove. Normally, as shown in FIG. 7, crosspiece 76 bears against the underside of cover 14, the cover being shiftable with respect to base 12 of the case about the axis of pin 28. It may be appreciated, especially in FIG. 6, that pin 28 extends through a pair of aligned, transverse apertures in cover 14 and thus mounts the latter for pivotal movement about such pin. Note in FIG. 7 that the underside of the rearmost extremity of cover 14 rests on and engages the upper surface of insulator 36 to limit swinging movement of cover 14 in a clockwise sense about pin 28.

When case 10 is gripped by the operator and cover 14 is depressed by the thumb or fingers, the crosspiece 76 is forced to shift downwardly which, in turn, moves welding tip 24 toward welding tip 20 as electrode 22 pivots counterclockwise about pin 28. In use in the welding of a workpiece 104, it will be appreciated by viewing FIG. 8 that the welding tips 20 and 24 clamp workpiece 104 therebetween as tip 24 is shifted by depressing the cover 14.

Movement of electrode 22 as just discussed is effected by a slight manual pressure since only the bias of the relatively small spring 44 must be overcome. During this movement of electrode 22, crank member 72 remains fixed with respect to electrode 22 and does not swing about pin 74. However, once the tips 20 and 24 are clamped on the workpiece 104, additional pressure on cover 14 causes member 72 to pivot in a counter clockwise sense about pin 74, whereupon spring 62 is partially compressed all as illustrated in FIG. 8.

The additional manual pressure needed to overcome the bias of spring 62 also causes welding tips 20 and 24 to tightly engage and clamp workpiece 104, thereby assuring that good electrical contact will be made with the workpiece. Compression of spring 62 is effected by link arms 80 which shift rearwardly (compare FIGS. 7 and 8) under the motion of crank member 72 and, in turn, cause block 64 and sleeve 66 to shift longitudinally rearwardly on sheath 56. Ultimately, the spring-loaded plunger 94 is brought into engagement with the actuator button 92 of microswitch 88. Thus, the welding generator control circuitry is triggered and the power supply then delivers welding current to the electrodes 16 and 22 in the conventional manner.

The operating sequence just described enables the operator to firmly clamp the workpiece 104 between the welding tips 20 and 24 before welding current is delivered to the electrodes. Thus, it is assured that the workpiece components to be welded are firmly clamped together and that a solid electrical contact with the workpiece is effected prior to delivery of welding current to the joint. However, once the actuator 86 is shifted sufficiently rearwardly to bring plunger 94 into engagement with button 92 to operate the microswitch 88, further manual pressure on cover 14 will not greatly increase the clamping pressure placed on the workpiece by the welding tips since such additional force will be absorbed by the spring 62 and will remain substantially constant due to the reduction in mechanical advantage caused by movement of member 72 to the position shown in FIG. 8. In this manner, manual force applied to the tweeser welder in addition to that required to operate the microswitch will not materially effect the uniformity of the weld joint. Also, engagement of the forward portions of base 12 and cover 14 ultimately prevents further application of pressure to the electrodes. Since the pressure applied by the welding tips has a direct bearing on the resistance of the joint and, hence, the magnitude of the welding current that will flow through the joint, these are important features of the instant invention as the effects of variations in manual strength of individual operators or of a particular operator during the working day are minimized.

In order to control the pressure at the workpiece so that the welder may be adapted to accommodate various applications, the knurled nut 60 is provided so that the tension of spring 62 may be adjusted. To facilitate this adjustment, an elongated, transversely U-shaped plate 106 is recessed into the underside of base 12 and the outer surfaces of side walls 13 to serve as a door which is hinged at the rear of case 10 by a pair of screws 108 extending through respective ears 110 of plate 106. Base 12 has a rectangular opening 112 therein which is normally covered by plate 106 and which, when plate 106 is swung open, permits access to nut 60 so that the same may be rotated to control the tension of spring 62.

It will be appreciated that the fact that spring 62 is coiled around electrode 22 results in a considerable space saving and, furthermore, assists in producing a structural configuration which may be housed in a case that is adapted to be conveniently hand-held. Manifestly, if case 10 had substantial width relative to its length, manipulation and operation of the welder by one hand would be more cumbersome. In this regard, note also that the offset 34 on the internal end of rod 26 maintains the profile of the mechanical components of the welder as low as possible and closely spaced from base 12.

Additionally, it should be understood that for heavier welding applications the welding device shown and described herein may be adapted for bench mounting. When employed as a bench welder, base portion 12 could take the form of a conductive metal bar rigidly secured to the bench mount.

Having thus described the invention, what is claimed as new and desired to be secured by Letters Patent is:

1. In a tweezer welder:
a case adapted to be hand-held;
a first electrode extending from said case and terminating in a welding tip remote from the case;
a second electrode extending into said case and terminating externally of the case in a welding tip disposed adjacent the welding tip of said first electrode;
means in said case mounting said second electrode for movement of the welding tip thereof toward and away from the welding tip of said first electrode;
switching means in said case for controlling the flow of welding current to said electrodes;
an actuator carried by said second electrode and shiftable from a normal, inoperative position to an operative position actuating said switching means;
means shiftably mounted on said second electrode and disposed to be manually shifted in a direction to move the welding tip of said second electrode toward the welding tip of said first electrode to thereby clamp a workpiece between said welding tips; and
linkage means coupling said shiftable means with said actuator for shifting the latter to said operative position thereof in response to movement of said shiftable means relative to said second electrode after said clamping of the workpiece, said case including a base portion having a cover overlying said base and mounted for movement toward and away therefrom, said second electrode extending between the base and the cover with said shiftable means disposed for engagement by said cover as the latter is shifted toward said base.

2. The invention of claim 1, wherein said second electrode is elongated, and wherein is provided structure mounting said actuator on said second electrode for movement longitudinally thereof between said positions, and spring means operably associated with said actuator and biasing the latter toward said normal position thereof.

3. The invention of claim 2, wherein said spring means is coiled around said second electrode.

4. The invention of claim 3, wherein said spring means has a pair of opposed ends, one of said ends being in engagement with said structure.

5. The invention of claim 2, wherein said shiftable means comprises a crank mounted for pivotal movement about an axis extending transversely of said second electrode, said linkage means including a link arm pivotally connected to said crank and said structure.

References Cited

UNITED STATES PATENTS

| | | | |
|---|---|---|---|
| 2,267,297 | 12/1941 | Campbell | 219—90 |
| 2,689,899 | 9/1954 | Faulk et al. | 219—90 |
| 2,371,664 | 3/1945 | Workman | 219—90 |

RICHARD M. WOOD, *Primary Examiner.*

P. W. MAY, *Assistant Examiner.*